United States Patent [19] … [11] Patent Number: 4,896,365
Oota et al. … [45] Date of Patent: Jan. 23, 1990

[54] VIDEO SIGNAL BINARY-CODING APPARATUS AND METHOD

[75] Inventors: Minoru Oota, Odawara; Toshihiro Hananoi, Ninomiyamachi, both of Japan

[73] Assignee: Hitachi, Ltd., Tokyo, Japan

[21] Appl. No.: 268,611

[22] Filed: Nov. 7, 1988

Related U.S. Application Data

[63] Continuation of Ser. No. 922,336, Oct. 23, 1986, abandoned.

[30] Foreign Application Priority Data

Oct. 24, 1985 [JP] Japan ................................. 60-236345

[51] Int. Cl.$^4$ ............................................. G06K 9/40
[52] U.S. Cl. ........................................ 382/53; 358/464
[58] Field of Search ..................... 382/50, 53; 358/282

[56] References Cited

U.S. PATENT DOCUMENTS 4,674,126 6/1987 Kotera .................................. 382/53
4,675,909 6/1987 Egami et al. ........................... 382/50

Primary Examiner—Leo P. Picard
Assistant Examiner—Lincoln Donovan
Attorney, Agent, or Firm—Antonelli, Terry & Wands

[57] ABSTRACT

A binary-coding which is effected converts a video signal into binary-coded outputs corresponding to white and black. More particularly, the binary-coding method and apparatus produces a black peak signal by following the black peak of a video signal, and makes a determination based on this black peak signal and video signal as to whether or not the video signal is rich in the black components so as to provide a binary slice select reference signal which takes the H level when the video signal is rich in the black components, holds the slice select reference signal for several scans in the vertical direction and for several bits in the horizontal direction, selects a binary-coded waveform obtained by slicing the video signal at a predetermined slice level when at least one among the slice select reference signals held is found at the level H indicating that the video signal is rich in black components, and outputs it as binary-coded output. Accordingly, a binary-coding method and apparatus is provided wherein when any hand-written or printed dark characters or the like are detected as a video signal and are binary-coded into white and black levels, the binary-coded output can be reproduced without being smudged or fuzzed dark.

1 Claim, 2 Drawing Sheets

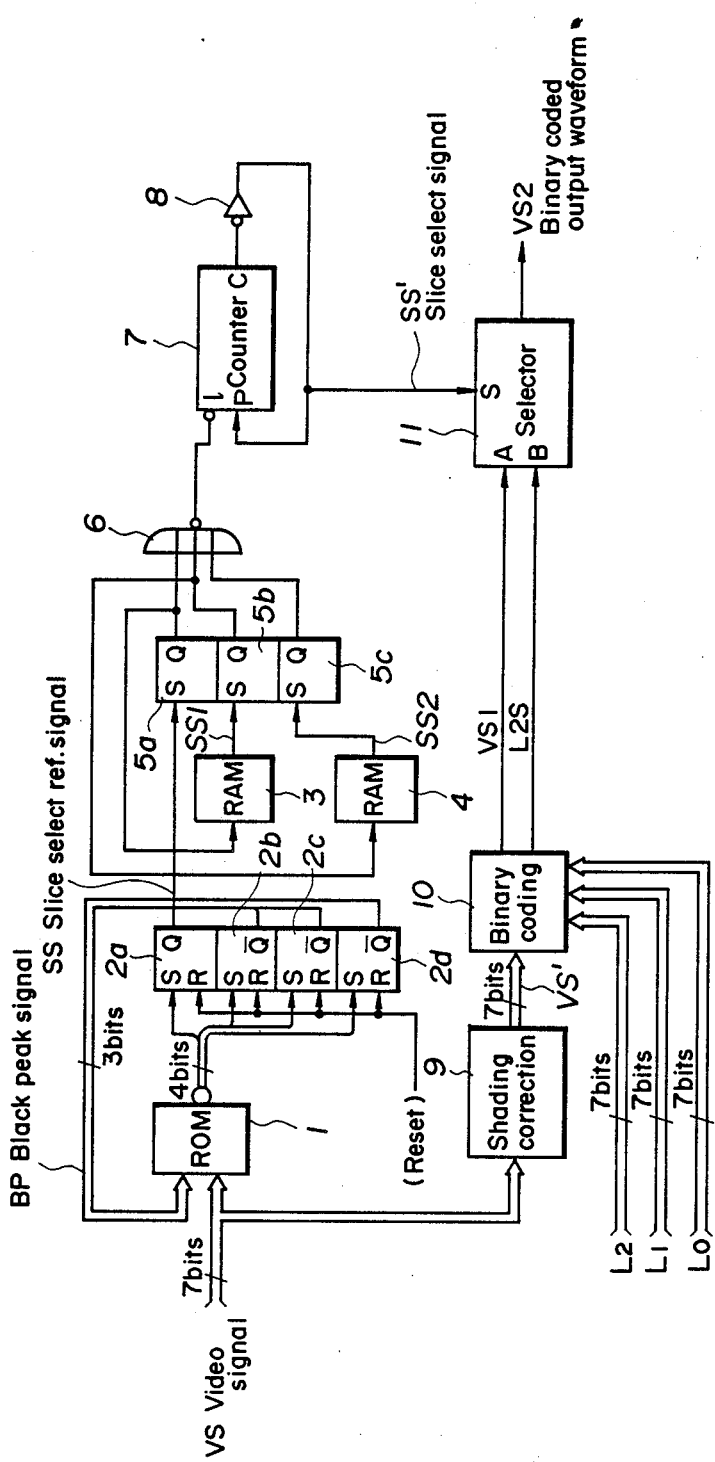

VIDEO SIGNAL BINARY-CODING APPARATUS AND METHOD

This application is a continuation of application Ser. No. 06/992,336, filed on Oct. 23, 1986 now abandoned.

BACKGROUND OF THE INVENTION (a) Field of the Invention:

The present invention relates to a binary-coding apparatus and method for video signals which are used in an optical character reader facsimile, etc., and more particularly to a video signal binary-coding circuit optimally and effectively usable in producing binary-coded white and black-level signals from video signals derived from hand-written or printed dark characters and the like to prevent the images of such characters from being smudged dark when being reproduced as a result of the binary-coded black-level signal abnormally increasing.

(b) Related Art Statement:

In the prior-art video signal binary-coding circuit, a video signal is sliced at three different levels. A video signal at a level higher than the upper and middle slice levels is converted into the black level, a video signal at a level lower than the lower slice level is converted into the white level, and a video signal at an intermediate level, between the middle and lower slice levels, is converted into the white or black level depending on the surrounding condition. A video signal at an intermediate level between the above-mentioned middle and lower slice levels is binary-coded taking into account the surrounding condition, using a mask of 3 bits by 3 scans, and is converted into the white level if in the surrounding condition a video signal at a level higher than the upper slice level is found, or into the black level if no such video signal exists. The reason why the video signal at the intermediate level between the middle and lower slice levels is binary-coded in accordance with the surrounding condition, namely, in determining the existence of the black or white level is that the black and white levels are balanced with each other to optimize the binary-coded signal. The inventions related with the above-mentioned prior-art video signal binary-coding technique are disclosed, for example, in the Unexamined Patent Publications (Kokai) Nos. 57-27376, 57-81687 and 58-109979.

However, when the above mentioned prior-art video-signal binary-coding circuit is used to binary-code video signals derived from dark characters written by hand or printed by a laser beam printer (LBP), the image reproduced using the binary-coded signals will be smudged dark. Namely, the conventional techniques of video signal binary-coding are disadvantageous in that any hand-written or printed dark characters are binary-coded as inclined to the black level because the balance between the black and white levels is lost.

SUMMARY OF THE INVENTION

Accordingly, the present invention seeks to provide a video signal binary-coding apparatus and method which can be used in binary coding of hand-written or printed dark characters or the like detected as video signal to produce binary-coded white and black-level signals to prevent an image reproduced from such binary-coded signals from being smudged dark.

The above object can be attained by implementing a video signal binary-coding circuit, according to the present invention, in which the black peak level of a video signal is first followed to provide a black peak signal; a determination is made based on the black peak signal and video signal as to whether or not the video signal is heavy in black components to produce a binary slice select reference signal indicative of the determination result; many slice select reference signals produced by effecting a predetermined number of scans are next stored; a plurality of the slice select reference signals corresponding to a predetermined range which takes as center a region to be binary-coded on an original is outputted; and in which when a slice select reference signal is indicating that the video signal is abundant in black components is found among the plurality of slice select reference signals, a binary-coded waveform is produced by slicing the video signal at predetermined slice levels is outputted as a binary-coded output signal over a predetermined bit width.

These and other objects and advantages of the present invention will be better understood from the ensuing description made by way of example of the embodiment according to the present invention with reference to the drawings.

BRIEF DESCRIPTION OF THE DRAWINGS

FIG. 3 is a block diagram of an embodiment of video signal binary-coding circuit according to the present invention.

DETAILED DESCRIPTION OF THE PREFERRED EMBODIMENTS

Figure 1:
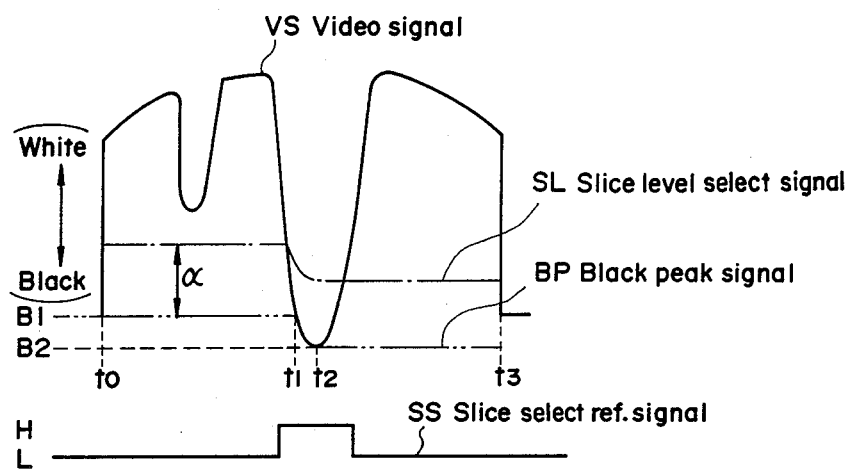
FIG. 1 shows waveforms explaining the principle of the production of slice select reference signal used in the present invention.

Referring now to the FIG. 1 illustrated waveforms, the relation among a video signal VS for one scan, black peak signal BP produced based on this video signal VS, slice level select signal SL, and a slice select reference signal SS is shown. The video signal VS is one not yet subject to the shading correction, in which the portion at higher level is white while the portion at lower level is black. The "shading correction" referred to herein is such that a difference in transfer characteristic caused by a difference in light dose depending on the position of characters or the like scanned on an original is corrected.

As shown in FIG. 1, the black peak signal BP is produced by following the black peak level of the video signal VS. Since the black peak of the video signal VS has a level B1 for a period of time from t0 to t1, the black peak signal BP will keep the level B1. For a period of time from t1 to t2, the black peak signal BP will correspond to the same waveform as the video signal VS since the level of the video signal VS falls from B1 to B2. For the period of time from t2 to t3, the black peak signal BP will take the level B2.

The slice level select signal SL is produced by adding a predetermined value $\alpha$ to the wave height of the above-mentioned black peak signal BP as shown in FIG. 1. The slice select reference signal SS will take the H (high) level when the result of a comparison between the video signal VS and slice level select signal SL meets the requirement that the video signal VS be made smaller than the slice level select signal SL. That is, this slice level select reference signal SS is a binary signal which takes H or L (low) level. When the video signal VS is higher in black level than the slice level select signal SL, namely, when the characters printed on an original or form are dark, the slice select reference signal SS will take the H level. By selecting a signal portion sliced at an arbitrary high slice level (where the binary-coded output is so small that any image will not be smudged dark) when the slice select reference signal SS is at the H level, it is possible to improve the resolution of the binary-coded output of the dark printed portion.

Figure 2:
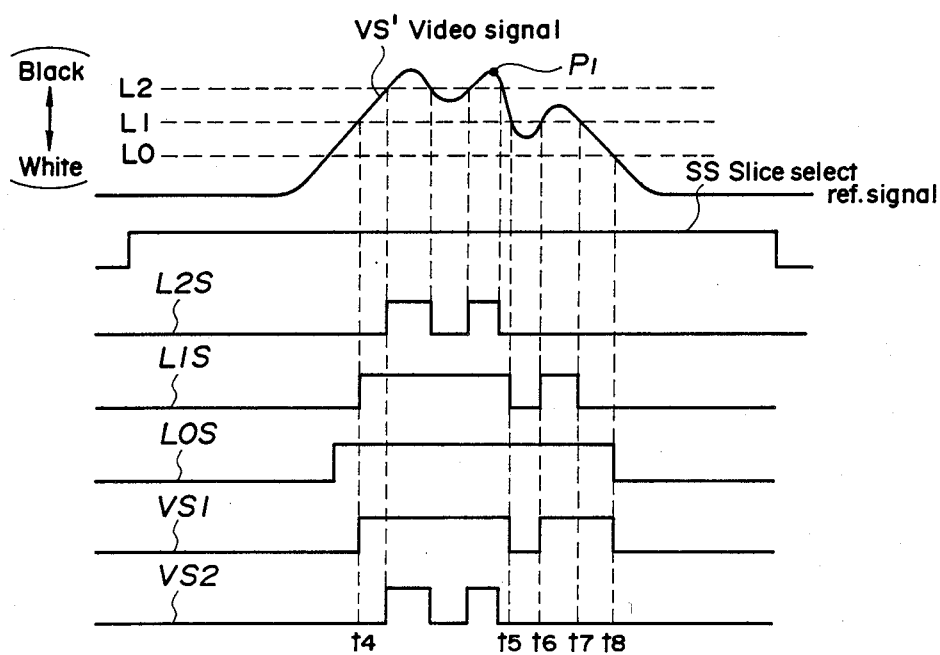
FIG. 2 shows waveforms indicating the principle of the inventive video signal binary-coding circuit.

The method of binary-coding the video signal VS using the slice select reference signal SS shown in FIG. 1 will be explained herebelow with reference to the waveforms shown in FIG. 2. As shown in this Figure, the waveform of a video signal VS' is obtained by shading-correction of the video signal VS shown in FIG. 1, enlarging one portion thereof and taking as black the portion of the signal at higher level while the portion at lower level is taken as white. In FIG. 2, L0, L1 and L2 indicate the binary slice levels, respectively. The binary-coded waveforms L2S L1S and L0S are those resulted from slicing of the video signal VS' at the levels L0, L1 and L2, respectively.

The binary-coded output in the embodiment according to the present invention and the one in the conventional technique will be explained herebelow in terms of a comparison between them with reference to FIG. 2. First, as already described, the binary-coded output in the conventional technique is produced by a method by which a portion above the slice level L1 is regarded as having the black level, a portion below the level L0 is regarded as having the white level and a portion between the slice levels L0 and L1 is regarded as having the white level when any bit at a level higher than the slice level L2 is found in the surrounding defined using a mask of 3 bits by 3 scans to refer the surrounding condition, or as having the black level when no such bit is found in the surrounding. More particularly, in the example shown in FIG. 2, the level is H for a period of time from t4 to t5 as shown in the conventional binary-coded output waveform VS1. For the time period from t5 to t6, the level is L, and for the period from t6 to t8, the level is H. The reason why the level stays at L for the period of time from t5 to t6 is that a point P1 at a level higher than the level L2 exists one bit short of the video signal VS'. Similarly, the level is H for the period from t7 to t8 because no point at a level higher than the level L2 exists one bit before the video signal VS'. Although the production of the binary-coded output waveform VS1 with reference to only one bit at the right and left of the video signals VS' to be binary-coded has been described in connection with this example, such binary-coded output waveform is produced actually using a mask of 3 bits by 3 scans to refer to the conditions of a 8-bit range of surrounding in addition to the range of 2 bits in total at the right and left.

In the embodiment in consideration, when the slice select reference signal SS has the H level, the scanned portion is determined to be heavily dark (black) and a binary-coded waveform L2S obtained by slicing the video signal at the slice level L2 is delivered as binary-coded output waveform VS2, whereby it is possible to produce a printed dark portion with an improved resolution. Also, by providing a slice level higher than the upper slice level L2 and selecting the slice output thus provided as a final binary-coded output waveform, it is possible to further improve the resolution of reproduction. Since a conventional slice output is delivered as selected when the slice select reference signal SS has the L level, the conventional binary-coded output waveform remains for a portion of printed characters where the density or darkness is lower than an ordinary one.

It should be noted that the slice select reference signal SS shown in FIG. 2 is produced in a same manner as in the production of the slice select reference signal SS shown in FIG. 1. The binary-coded output waveform may be produced using this slice select reference signal as it is. However, the present invention is not limited to this embodiment. Such an arrangement may be made that the slice select reference signal SS is held for several scans in the vertical direction and several bits in the horizontal direction and when any H-level portion is found in the slice select reference signal SS thus held, a new slice select signal is formed, thereby delivering a binary-coded output waveform VS2.

In the embodiment shown in FIG. 3, the above-mentioned method is adopted in order to hold the slice select reference signal SS for 3 scans in the vertical direction and one bit in the horizontal direction and to produce a new slice select signal when any H-level portion exists in the slice select reference signal SS thus held, thereby changing the binary-coded waveform from one to another.

As shown in FIG. 3, a ROM 1 and flip-flop 2a cooperate to produce a slice select reference signal SS, and the ROM 1 and flip-flops 2b, 2c and 2d work to produce a black peak signal BP. Based on the slice select reference signal SS thus produced, a circuit formed from RAMs 3 and 4, flip-flops 5a, 5b and 5c, NOR circuit 6, counter 7 and an inverter 8 produces the above-mentioned slice select signal SS'. Also a circuit consisting of a shading-correction circuit 9 and binary-coding circuit 10 produces, based on a video signal VS, a conventional binary-coded output waveform VS1 and binary-coded waveform LS2. A selector 11 selects, for delivery, one of the conventional binary-coded output waveform VS1 and binary-coded waveform VS2 as final binary-coded output waveform VS2 according to the slice select signal SS'.

The embodiment shown in FIG. 3 functions as will be described below:

A 7-bit video signal VS is supplied to the shading-correction circuit 9 in which it is converted into a shading-corrected 7-bit video signal VS' which in turn will be supplied to the binary-coding circuit 10. It will be binary-coded there at the slice levels L0, L1 and L2 to provide a conventional binary-coded output waveform VS1 based on each of the binary-coded waveforms. The binary-coding circuit 10 refers to the condition of a 8-bit range of surrounding using a mask of 3 bits by 3 scans of the video signal VS' (to be binary-coded) and produces a binary-coded output waveform VS1. Therefore, the binary-coded output waveform VS1 corresponds to a preceding video signal having been scanned. As shown, the binary coding circuit 10 delivers a binary-coded waveform L2S and a conventional binary-coded output waveform VS1 to the selector 11.

The video signal VS is also supplied to the ROM 1. The ROM 1 and the flip-flops 2a, 2b, 2c and 2d operate to provide a 3-bit black peak signal BP and a 1-bit slice select reference signal SS based on the supplied video signal VS. Say, as shown, the ROM 1 compares the supplied video signal VS (7 bits) with the black peak signal BP (3 bits) of the preceding bit at a point to be binary-coded to the output, when the video signal VS is found darker (black), the high-order 3 bits of the video signal is a new black peak signal BP, or the black peak signal BP of the above-mentioned preceding bit when the video signal VS is lighter (white). Also, a predetermined digit α is added to the black peak signal BP to produce a slice level select signal SL (see FIG. 1) and this slice level select signal SL is compared with the video signal VS. If the result of comparison shows that the video signal VS is larger than the slice level select signal SL, the ROM 1 has the slice select reference signal SS take the H level, or when the black peak signal PB is found smaller than the slice level select signal SL, the ROM 1 will have the slice select reference signal SS take the L level.

The slice select reference signal SS outputted from the flp-flop 2a is stored into the flip-flop 5a of which the output is connected to the RAM 3 and NOR circuit 6. In this way, slice select reference signals SS in the scan one before the current scan are stored one after another into the RAM 3.

Also at a time when the slice select reference signals SS in the current scan are outputted from the flip-flop 2a, the slice select reference signals SS1 in the preceding scan at the same horizontal position as the point to be binary-coded of the slice select reference signal SS in the above-mentioned current are read from the RAM 3. The slice select reference signals SS1 are stored into the flip-flop 5b of which the output is connected to the RAM 4 and NOR circuit 6. Thus, the slice select reference signals SS2 in the scan two before the current scan are stored one after another into the RAM 4.

Similarly at the time when the slice select reference signals SS in the current scan are outputted from the flip-flop 2a, slice select reference signals SS2 in the scan two before the current scan at the same horizontal position as the point to be binary-coded of the slice select reference signals SS in the above-mentioned current scan are read from the RAM 4. The slice select reference signals SS2 are stored into the flip-flop 5c and delivered to the NOR circuit 6. Therefore, the NOR circuit 6 receives slice select reference signals SS, SS1 and SS2 for 3 scans at the same horizontal position as on the original, and outputs a L-level signal if at least any one among the signals SS, SS1 and SS2 is at the H level. The data write and read operations with respect to the RAMs 3 and 4 are performed under the control of an address control circuit (not shown).

The output of the NOR circuit 6 is connected to the terminal 1 of the counter 7. When the input to the terminal 1 of this counter 7 falls from H to L, the output at the terminal c is inverted from H to L, and when the input at the terminal 1 rises from L to H, the counter 7 starts counting. After counting 16 reference clocks (not shown), the counter 7 has the output at the terminal c thereof inverted from L to H. When an L-level input is given to the terminal p of the counter 7, the output at the terminal c is held at the H level. The above-mentioned reference clock defines the operating timing of the ROM 1, RAMs 3 and 4, flip-flops 2a to 2d and 5a to 5c, and also the video signal VS is inputted synchronously with this reference clock.

If any one of the slice select reference signals SS, SS1 and SS2 is at the H level, the NOR circuit 6 delivers an L-level output, whereby an L-level signal is delivered at the terminal c of the counter 7 so that the slice select signal SS' takes H level. Thereafter when the NOR circuit 6 delivers an H-level output, the counter 7 starts counting. When the counter counts 16, the output at the terminal c of the counter 7 is inverted from L to H. Accordingly, the slice select signal SS' takes the L level and and L-level input is supplied to the terminal p of the counter 7, so the output at the terminal c is held at the H level. The counter 7 makes the slice select signal SS' take the H level for the period during the output of the NOR circuit 6 is at the L level as well as for the period during which the counter 7 counts 16.

In case when the slice select signal SS' is at the H level, the selector 11 selects the binary-coded waveform L2S; when the signal SS' is at the L level, the selector 11 selects the conventional binary-coded output VS1 and delivers it as the final binary-coded output VS2. It should be noted that in this embodiment, the outputs VS1 and LS2 of the binary-coding circuit 10 are delayed 8 bits in time with respect to the slice select signal SS' and that the slice select signal SS' outputted by the counter 7 and inverter 8 is such that it stays level for a period 16 bits longer. Thus, the slice select signal SS' acts on the 8 bits before and after the position (1 bit) to be binary-coded.

Therefore, according to this embodiment, when the video signal VS is dark (black), binary-coded waveform L2S are delivered over 8 bits before and after the video signal VS, and in other cases, the conventional binary-coded output VS1 is delivered as the binary-coded output waveform VS2. Thus, this embodiment permits to improve the resolution of the dark printed portion.

In the embodiment having been described in the foregoing, the slice select reference signal is held for 3 scans in the vertical direction and for 1 bit in the horizontal direction to produce a new slice select signal SS'. However, the present invention is not limited to this embodiment, but the numbers of scans and bits for which the slice select reference signal is held may be freely selected.

Also in the embodiment having been described above, when the counter 7 counts 16, the output at the terminal c is made to take the H level. However, the present invention is not limited to such arrangement, but the number of counts by the counter 7 may be other than 16.

Furthermore in the above-mentioned embodiment, a gate circuit may be used in place of the ROM 1.

Again in the embodiment described in the foregoing, two RAMs (RAMs 3 and 4) are used, but the present invention is not limited to this arrangement. The number of RAMs used may be selected as necessary.

We claim:

1. A video signal binary-coding apparatus for converting a video signal corresponding to a predetermined bit width of information into binary-coded signals corresponding to white levels and black levels, comprising:

first means for producing a black peak signal in accordance with the black peak level of said video signal itself, and determining, in response to both said black peak signal and said video signal, whether or not said video signal is rich in the black component, and outputting a binary slice select reference signal indicative of the result determined, wherein said first means includes a ROM and a plurality of bistable circuits each responsive to an output of said ROM for generating at the output of a first of said bistable circuits a 1-bit slice select reference signal and at the respective outputs of the remaining bistable circuits respective bits of a 3-bit black peak signal which represents the preceding bit scan of said video signal to which the video signal of a subsequent bit scan is compared with by said ROM;

second means, coupled to the output of said first bistable circuit, for consecutively storing a plurality of slice select reference signals produced by a predetermined number of successive scans and outputting said stored plurality of slice select reference signals corresponding to a predetermined range of said video signal which is to be binary-coded, wherein said second means includes a first bistable memory circuit having an input coupled to the output of said first bistable circuit and an output coupled to an input of a first RAM, a second bistable memory circuit having an input coupled to an output of said first RAM and an output coupled to an input of a second RAM, and a third bistable memory circuit having an input coupled to an output of said second RAM and an output, wherein each one of said plurality of slice select reference signals, corresponding to successive scans, is stored in respective ones of said bistable memory circuits; and third means, coupled to said second means, for effecting delivery as a binary-coded output signal, corresponding to the predetermined bit width of said video signal, a binary-coded waveform produced by slicing said video signal at a predetermined slice level when it is determined that a slice select reference signal is present indicating that many black components exist in accordance with the plurality of slice select reference signals delivered from said second means, wherein said third means is comprised of a NOR logic gate having a plurality of inputs and an output and a bit counter, said NOR logic gate inputs being respectively coupled so as to receive slice select reference signals from the outputs of said first, second and third bistable memory circuits, and wherein said bit counter has an input coupled to the output of said NOR logic gate and an output for providing a slice select signal in response to at least one slice select reference signal from said second means to effect in slicing of said video signal corresponding to a threshold level indicative of the presence of many black components.

* * * * *